United States Patent Office.

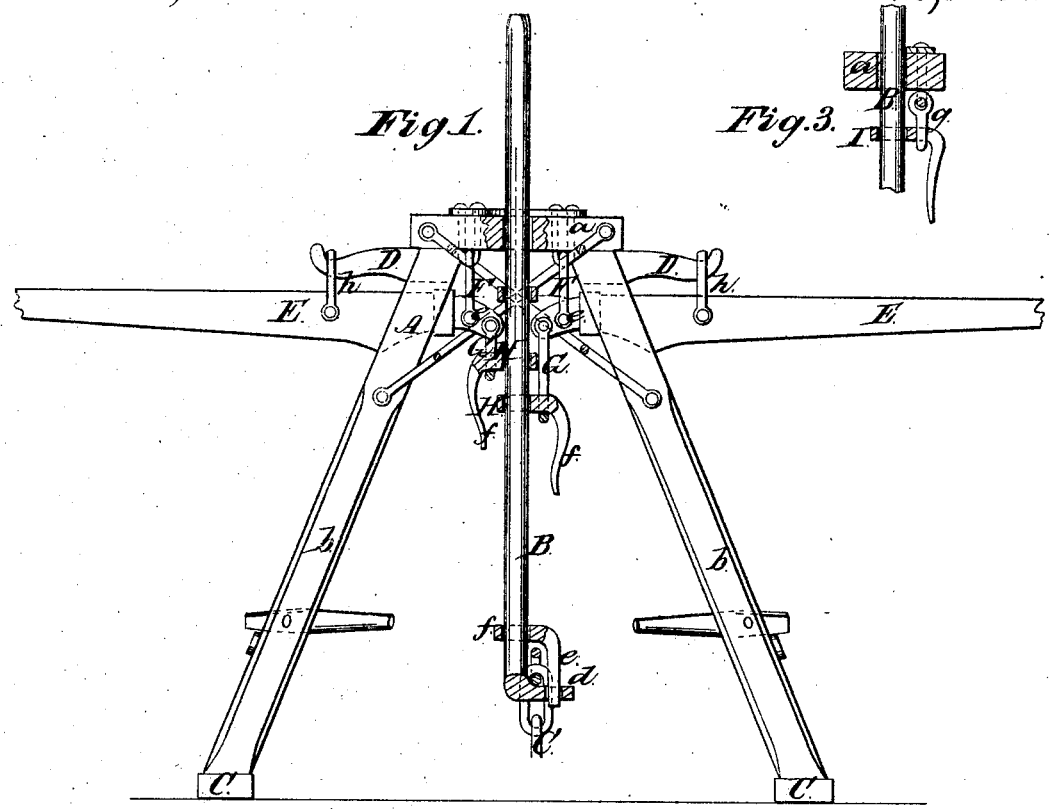
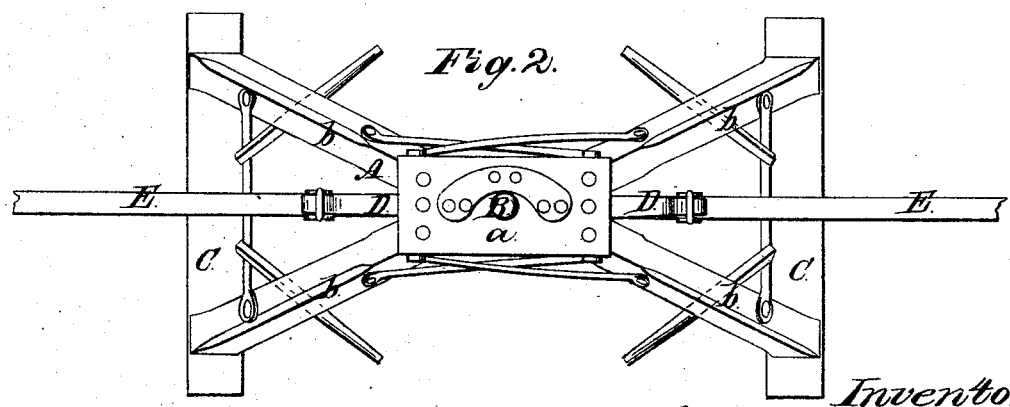

G. W. PRESSEY, OF HAMMONTON, NEW JERSEY.

Letters Patent No. 69,701, dated October 8, 1867.

---

IMPROVEMENT IN STUMP-EXTRACTOR.

---

The Schedule referred to in these Letters Patent and making part of the same.

---

TO ALL WHOM IT MAY CONCERN:

Be it known that I, G. W. PRESSEY, of Hammonton, in the county of Atlantic, and State of New Jersey, have invented a new and improved Device for Extracting Stumps, Lifting Stones, &c.; and I do hereby declare that the following is a full, clear, and exact description thereof, which will enable others skilled in the art to make and use the same, reference being had to the accompanying drawings, and to the letters of reference marked thereon.

This invention relates to a new and improved device for extracting stumps and lifting stones and other heavy bodies.

The invention consists in a novel arrangement of pawls with hand-levers and a lifting-bar, as hereinafter fully shown and described, whereby a very simple, powerful, and efficient lifting device is obtained.

The invention also consists in an improved hook or fastening for connecting the lifting-bar with the article to be raised. In the accompanying sheet of drawings—

Figure 1 is a side view of my invention, partly in section.

Figure 2, a plan or top view of the same.

Figure 3, an enlarged sectional view of one of the pawls pertaining to the same.

Similar letters of reference indicate like parts.

A represents a frame which supports the working parts of the machine, and which should be made sufficiently strong to hold in a suspended state the article to be raised. The frame may be constructed of a horizontal cap-piece, $a$, supported at each end by two oblique bars, $b\ b$, the lower ends of which are framed into sill-pieces $c\ c$. B represents a lifting-bar, which, in this instance, is of cylindrical form, and perfectly smooth on its exterior; it may, however, be of square or other form, and provided with teeth, to form a rack-bar. The smooth bar, however, as represented in the drawings, will probably be used. This lifting-bar passes loosely up through the centre of the cap-piece $a$, and its lower end is bent outward horizontally, or at right angles with its main part, as shown in fig. 1; and has a hole, $d$, made through it to receive a pin, $e$, which is formed with an eye, $f$, at its upper end, for the bar B to pass through. This pin, when fitted in the hole $d$, secures the chain C to the lifting-bar, the links of the chain being prevented from slipping through the eye or space between the pin and the bar, the link in said eye or space having an upright or vertical position, while those at each side have a horizontal or reverse position, and the breadth of the links being greater than the width of the eye or space, causes the chain to be firmly secured in position. At the upper part of the frame A there are two horizontal projections or arms D D, and E E are two levers, the fulcrum pins $e$ of which are in the lower ends of links F F, suspended from the cap-piece $a$. These levers project from opposite sides of the frame A, and to their inner ends are connected, by links G, pawls H, one to each lever. The pawls H are simply rings, through which the lifting-bar B passes loosely, the links G being attached to the outer edges of the pawls, and each pawl provided with a pendent arm, $f$. A pawl, I, similar to H H, is suspended by a link, $g$, from the cap-piece $a$; the lifting-bar B also passing loosely through it. (See fig. 3.) By operating the levers E E the pawls H will of course be moved up and down, sliding loosely down on the lifting-bar, and grasping it firmly when raised, so as to draw the lifting-bar up with them. The grasping or clutching of the lifting-bar by the pawls is due to the attachment of the links G to the edges of the same, the upward pull at one side of the pawls causing the latter to "bite" or clutch firmly the lifting-bar. In descending, the pawls will not clutch the lifting-bar, as they are about balanced, and remain in a horizontal position as they are thus moved. The pawl I is a retaining pawl, and is designed to hold up the lifting-bar or prevent it from casually dropping when the pawls H descend. In order to release the lifting-bar from the pawls, the arms $f$ are pressed inward or towards the lifting-bar. The arm of the pawl I is actuated in a similar manner. The levers E E are held upward when necessary or desired, by placing links $h$ in the levers over the arms D D.

This machine operates very efficiently, is simple in construction, and may be constructed at a very moderate cost.

Having thus described my invention, I claim as new, and desire to secure by Letters Patent—

The pawls H H, constructed in annular form, so as to fit loosely on the lifting-bar B, and provided with pendent arms $f$, in connection with the levers E E, all arranged and applied to operate in the manner substantially as and for the purpose set forth.

I also claim the holding and retaining pawl I, when used in combination with the pawls H H and the levers E E, substantially as and for the purpose specified.

I further claim the pin $e$, fitted on the lifting-bar B, in combination with the lower perforated bent end of the lifting-bar, all arranged for the purpose of holding the chain to the lower end of the lifting-bar, substantially as shown and described.

G. W. PRESSEY

Witnesses:
    GERRY VALENTINE.
    ALEX. AITKEN.